(12) United States Patent
Bakalo et al.

(10) Patent No.: US 12,282,848 B2
(45) Date of Patent: Apr. 22, 2025

(54) ESTIMATED ONLINE HARD NEGATIVE MINING VIA PROBABILISTIC SELECTION AND SCORES HISTORY CONSIDERATION

(71) Applicant: INTERNATIONAL BUSINESS MACHINES CORPORATION, Armonk, NY (US)

(72) Inventors: Ran Bakalo, Haifa (IL); Dana Levanony, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 17/247,584

(22) Filed: Dec. 17, 2020

(65) Prior Publication Data

US 2022/0198268 A1 Jun. 23, 2022

(51) Int. Cl.
*G06N 3/08* (2023.01)
*G06F 9/30* (2018.01)
(Continued)

(52) U.S. Cl.
CPC ............ *G06N 3/08* (2013.01); *G06F 9/30029* (2013.01); *G06F 9/3836* (2013.01); *G06F 18/2148* (2023.01)

(58) Field of Classification Search
CPC .......... G06N 3/08; G06N 3/063; G06N 3/082; G06N 3/04; G06N 3/084; G06N 20/00; G06N 3/045; G06N 5/04; G06N 5/022; G06N 20/20; G06N 5/025; G06N 5/043; G06N 20/10; G06N 3/047; G06N 3/048; G06N 3/088; G06N 3/098; G06N 5/045; G06N 3/0475; G06N 3/094; G06N 5/01; G06N 7/01; G06F 17/18; G06F 18/214; G06F 8/70; G06F 9/5027; G06F 11/3438;
(Continued)

(56) References Cited

U.S. PATENT DOCUMENTS 9,881,234 B2 * 1/2018 Huang ................ G06F 18/2411
10,037,601 B1 7/2018 Ben-Ari
(Continued)

OTHER PUBLICATIONS

Xu, Haiping, and Amol Gade. 2017, "Smart Real Estate Assessments Using Structured Deep Neural Networks." 2017 IEEE SmartWorld, Ubiquitous Intelligence & Computing, Advanced & Trusted Computed, Scalable Computing & Communications, Cloud & Big Data, . . . , Aug. 2017 IEEE. pp. 1-7. (Year: 2017).*
(Continued)

*Primary Examiner* — Luis A Sitiriche
(74) *Attorney, Agent, or Firm* — Caleb Wilkes

(57) ABSTRACT

According to one embodiment, a method, computer system, and computer program product for hard negative training is provided. The embodiment may include a computer receiving a training set, where the training set comprises one or more training samples. The computer trains a deep neural network (DNN) with the training set. The embodiment may also include determining, using the DNN, information for each of the one or more training samples, where the information includes one or more scores associated with the one or more training samples. The embodiment may further include generating a training epoch from the one or more training samples based on the information and updates the information based on using the training epoch with the DNN.

20 Claims, 5 Drawing Sheets

(51) Int. Cl.
*G06F 9/38* (2018.01)
*G06F 18/214* (2023.01)

(58) Field of Classification Search
CPC .. G06F 16/2465; G06F 18/213; G06F 18/241; G06F 18/2411; G06F 3/0674; G06F 40/58; G06F 8/75; G06F 9/526; G06F 18/217; G06F 18/2185; G06F 18/22; G06F 9/4856; G06F 9/5044; G06F 9/505; G06F 9/5072; G05B 23/0251
See application file for complete search history.

(56) References Cited

U.S. PATENT DOCUMENTS

| | | | | |
|---|---|---|---|---|
| 10,180,968 | B2* | 1/2019 | Steck | G06N 20/00 |
| 11,250,328 | B2* | 2/2022 | Liang | G06N 3/045 |
| 2019/0095785 | A1* | 3/2019 | Sarkar | G06N 20/00 |
| 2019/0130221 | A1* | 5/2019 | Bose | G06N 3/045 |
| 2020/0184333 | A1* | 6/2020 | Oh | G06N 3/044 |
| 2020/0410090 | A1* | 12/2020 | Baker | G06N 20/20 |

OTHER PUBLICATIONS

Ise, Takeshi & Oba, Yurika. 2019. "Forecasting Climatic Trends Using Neural Networks: An Experimental Study Using Global Historical Data", Frontiers in Robotics and AI. 6. 10.3389/frobt. 2019.00032. (Year: 2019).*

Gao, et al., "SD-CNN: A shallow-deep CNN for improved breast cancer diagnosis," Computerized Medical Imaging and Graphics 70, Mar. 2018 [accessed on Nov. 16, 2018], 17 pages, ResearchGate, DOI: 10.1016/j.compmedimag.2018.09.004, Retrieved from the Internet: <URL: https://www.researchgate.net/publication/323550361>.

Lai, et al., "DBT Masses Automatic Segmentation Using U-Net Neural Networks," Hindawi Computational and Mathematical Methods in Medicine, Nov. 12, 2019, 10 pages, vol. 2020, Article 7156165, DOI: 10.1155/2020/7156165, Retrieved from the Internet: <URL: https://www.hindawi.com/journals/cmmm/2020/7156165/>.

Loshchilov, et al., "Online batch selection for faster training of neural networks," Workshop track—ICLR 2016, Apr. 25, 2016, 20 pages, Cornell University, arXiv: 1511.06343v4, Retrieved from the Internet: <URL: https://arxiv.org/abs/1511.06343>.

Mell, et al., "The NIST Definition of Cloud Computing", National Institute of Standards and Technology, Special Publication 800-145, Sep. 2011, 7 pages.

Samala, et al., "Breast cancer diagnosis in digital breast tomosynthesis: effects of training sample size on multi-stage transfer learning using deep neural nets," IEEE Transactions on Medical Imaging, Sep. 17, 2018 [accessed on Oct. 5, 2020], 11 pages, vol. 38, Issue 3, Mar. 2019, IEEE, DOI: 10.1109/TMI.2018.2870343, Retrieved from the Internet: <URL: https://ieeexplore.ieee.org/document/8466816>.

Shrivastava, et al., "Training region-based object detectors with online hard example mining," 2016 IEEE Conference on Computer Vision and Pattern Recognition, Jun. 27-30, 2016 [accessed on Oct. 5, 2020], 9 pages, IEEE, Las Vegas, NV, USA, DOI: 10.1109/CVPR.2016.89, Retrieved from the Internet: <URL: https://ieeexplore.ieee.org/document/7780458>.

Van Grinsven, et al., "Fast Convolutional Neural Network Training Using Selective Data Sampling: Application to Hemorrhage Detection in Color Fundus Images," IEEE Transactions on Medical Imaging, Feb. 8, 2016 [accessed on Oct. 5, 2020], pp. 1273-1284, vol. 35, Issue 5, IEEE, DOI: 10.1109/TMI.2016.2526689, Retrieved from the Internet: <URL: https://ieeexplore.ieee.org/document/7401052>.

Zhang, et al. "2D Convolutional Neural Networks for 3D Digital Breast Tomosynthesis Classification," 2019 IEEE International Conference on Bioinformatics and Biomedicine (BIBM), Nov. 18-21, 2019 [accessed on Aug. 13, 2020], pp. 1013-1017, IEEE, San Diego, CA, USA, USA, DOI: 10.1109/BIBM47256.2019.8983097, Retrieved from the Internet: https://ieeexplore.ieee.org/document/8983097>.

* cited by examiner

ESTIMATED ONLINE HARD NEGATIVE MINING VIA PROBABILISTIC SELECTION AND SCORES HISTORY CONSIDERATION

BACKGROUND

The present invention relates, generally, to the field of computing, and more particularly to deep neural networks. A neural network is a computational model in computer science that is based on a collection of neural units. Each neural unit is an artificial neuron that may be connected with other neural units to create a neural network. The neural network may then be trained to find a solution to a problem where a traditional computer program fails, such as image processing. Deep neural networks, or deep learning, are a class of machine learning algorithms that use multiple layers of neural networks to progressively extract higher-level features from raw input. For example, in image processing, lower layers may identify edges, while higher layers may identify the concepts relevant to a human, such as digits, letters or faces.

SUMMARY

According to one embodiment, a method, computer system, and computer program product for hard negative training is provided. The embodiment may include a computer receiving a training set, where the training set comprises one or more training samples. The computer trains a deep neural network (DNN) with the training set. The embodiment may also include determining, using the DNN, information for each of the one or more training samples, where the information includes one or more scores associated with the one or more training samples. The embodiment may further include generating a training epoch from the one or more training samples based on the information and updating the information based on using the training epoch with the DNN.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
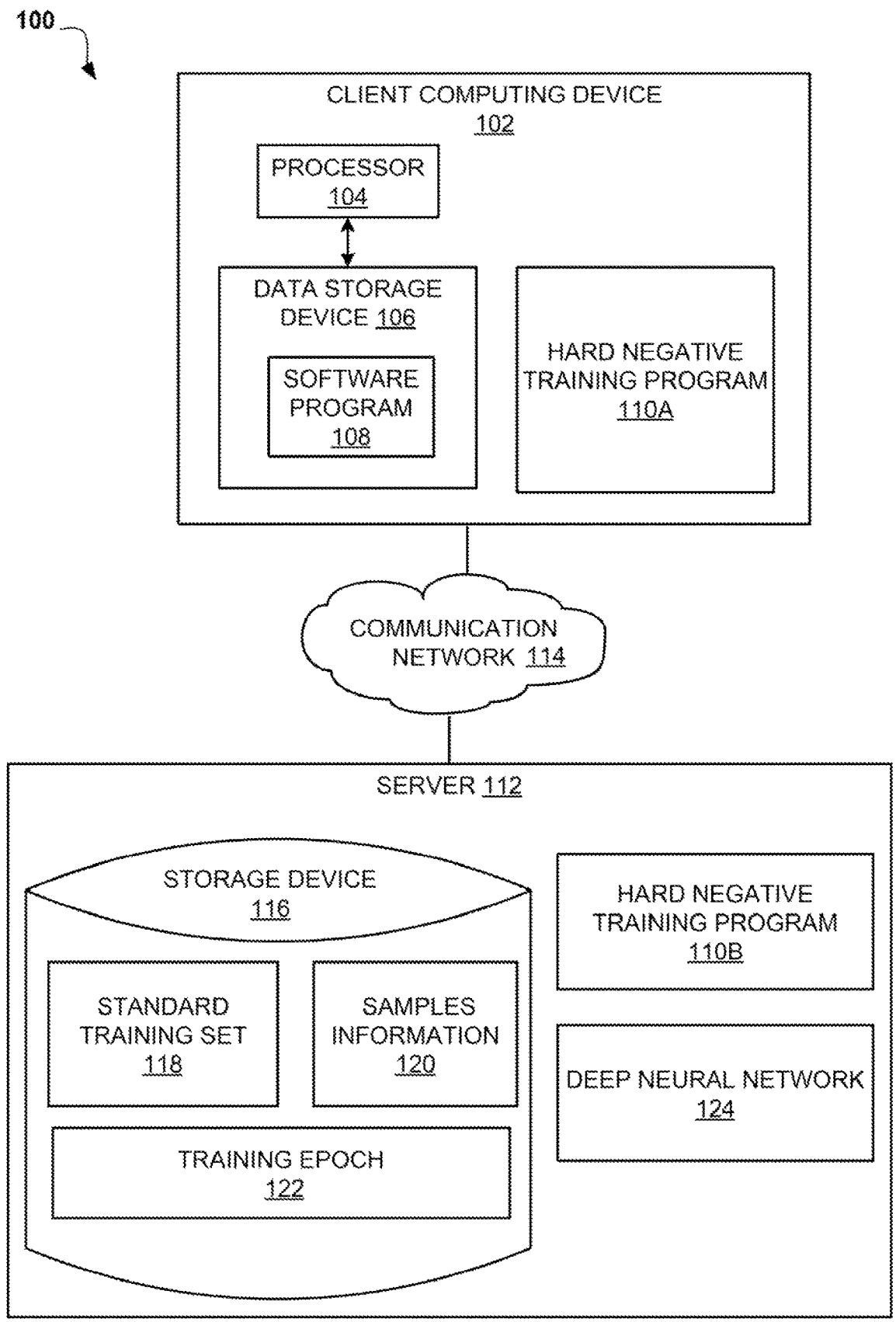
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly, to deep neural networks (DNNs). The following described exemplary embodiments provide a system, method, and program product to, among other things, generate a training epoch for a DNN based on the score history associated with samples in the epoch. Therefore, the present embodiment has the capacity to improve the technical field of training DNNs by maintaining a score for each sample and focus on hard cases based on the scores.

As previously described, a neural network is a computational model in computer science that is based on a collection of neural units. Each neural unit is an artificial neuron that may be connected with other neural units to create a neural network. The neural network may then be trained to find a solution to a problem where a traditional computer program fails, such as image processing. Deep neural networks, or deep learning, are a class of machine learning algorithms that use multiple layers of neural networks to progressively extract higher-level features from raw input. For example, in image processing, lower layers may identify edges, while higher layers may identify the concepts relevant to a human, such as digits, letters or faces.

The DNNs are not initialized with common sense and start with no concept of what is being learned, gradually updating parameters (e.g., weights) while learning from the training epochs, which may be evaluated based on what gives the best overall performance. Typically, a class imbalance may result when a trained DNN simply predicts the dominant class when the DNN is unsure. Uncertainty itself may be due to low variation in the training sample.

Thus, in order to improve the performance of DNNs in cases where the DNN has an incorrect outcome of a sample, these samples should be represented in the next training set. This approach of using samples where the DNN failed is known as hard negative mining. For example, computer vision has historically dealt with the issue in object detection problems where the background and foreground classes may be dominant on the scale of 1000:1 and, thus, may not allow the DNN to detect or focus on the objects.

Hard negative mining is an approach that incorporates a set of background samples that are selected based on the DNN giving an erroneous classification. The hard negative mining strategy, frequently, uses an iterative training approach that alternates between updating the detection model given the current set of examples, and then using the updated model to find new false positives to add to the hard negative mining training set. The process typically commences with a training set consisting of all object samples and a small, random set of background examples. This process is oftentimes performed manually and thus inefficient. As such, it may be advantageous to, among other things, implement a system that enables efficient training and performance improvement of the DNN by focusing on hard cases.

According to one embodiment, a method to improve deep neural network training may be implemented that generates an effective training epoch based on the scores and other information determined from the previous epochs used to train the DNN in the previous learning cycles. According to an example embodiment, the score may be a value that is associated with each sample and represents whether the DNN detected the sample as a positive or a negative sample. In another embodiment, the score may represent a probability that the DNN detected the sample correctly. According to an example embodiment, samples may be images, patches of images, slices of 3D volumes, and other relevant items.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to improve deep neural network training by generating a training epoch based on the scores and other information determined from the previous learning cycles.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a hard negative training program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a hard negative training program 110B, and deep neural network 124 and a storage device 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The storage device 116 may store a standard training set 118, samples information 120, and training epoch 122. The standard training set 118 may be a set of samples used to train deep neural network 124 during initiation. The sample information 120 may be a dataset or database that stores information related to each of the samples used in the standard training set 118. According to an example embodiment, samples information 118 may store for each of the samples an index number i for each sample, a flag or a Boolean value representing whether the sample is positive or negative, a last score estimate $s_i$ (i.e., the score from the last DNN processing of each sample), a number of epochs $\delta_i$ from the last processing and a history vector $u_i$ of the scores from all previous processing of each of the samples. According to an example embodiment, the history may be maintained for a predefined number of epochs according to a hyper parameter. The last score estimate $s_i$ may be assumed to be normalized to be between 0 and 1 (i.e. in [0,1]) such that a more difficult sample has a higher score (e.g. for binary classification setting, the score of a negative sample can be the probability to be classified as positive).

According to the present embodiment, the hard negative training program 110A, 110B may be a program capable of effectively training a deep neural network by generating and updating information for each sample and updating a training epoch based on the information, such as scores received from using the samples of the last training cycle as inputs for the DNN. The hard negative training method is explained in further detail below with respect to FIG. 2.

Figure 2:
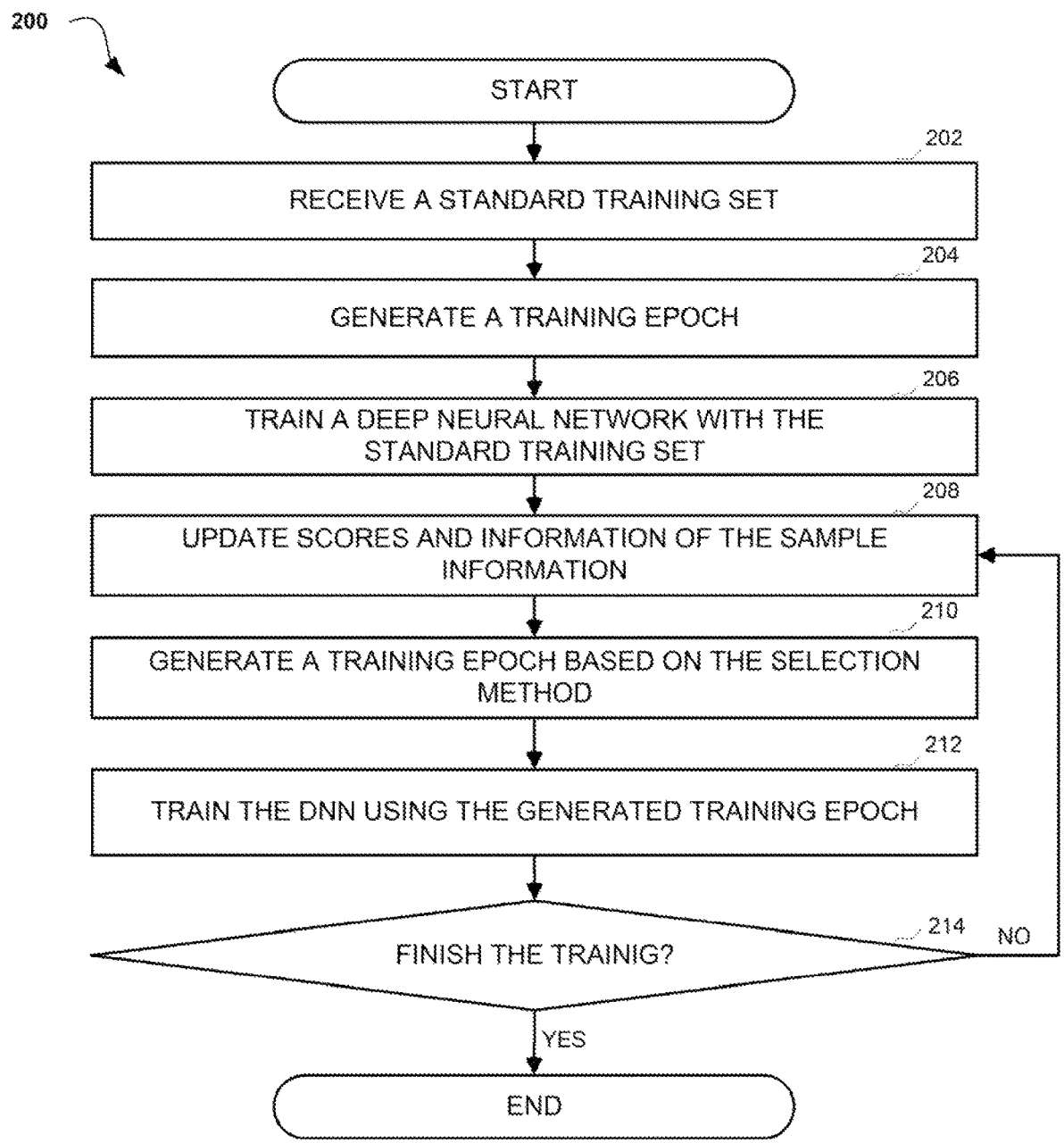
FIG. 2 is an operational flowchart illustrating a hard negative training process according to at least one embodiment.

Referring now to FIG. 2, an operational flowchart illustrating a hard negative training process 200 is depicted according to at least one embodiment. At 202, the hard negative training program 110A, 110B receives a standard training set. According to an example embodiment the hard negative training program 110A, 110B may receive a standard training set that includes a plurality of positive and negative samples. According to an example embodiment, the training samples may be in a binary classification setting having positive and negative samples. In another embodiment, the hard negative training program 110A, 110B may be applied to multi-class classification with selection for each class or classes subset.

Next, at 204, the hard negative training program 110A, 110B generates a training epoch. According to an example embodiment, the hard negative training program 110A, 110B may generate a training epoch 122 from the standard training set 118 and update the samples information 120. The training epoch 122 may be a subset of the standard training set 118 that is generated based on the scores and other available information from the sample information 120. According to an example embodiment, the hard negative training program 110A, 110B may use all of the samples from the standard training set 118 for the first training cycle.

Then, at 206, the hard negative training program 110A, 110B trains a DNN with the training epoch. According to an example embodiment, the hard negative training program 110A, 110B may start with random initialization of the DNN 124 and perform one or more cycles of learning using the training epoch 120 in order to update the weights associated with the nodes of the DNN using gradient-based optimization or another optimization approach. In another embodiment, the hard negative training program 110A, 110B may train a pretrained deep neural network with the training epoch 120 as an initialization step.

Next, at 208, the hard negative training program 110A, 110B updates scores and information of the sample information. According to an example embodiment, the hard negative training program 110A, 110B may feed the training epoch 120 to the DNN and update the sample information 120 with the score generated by the DNN, the index number, history vector, number of times the sample was used, and other statistical information.

Then, at 210, the hard negative training program 110A, 110B generates a training epoch based on the selection method. According to an example embodiment, the hard negative training program 110A, 110B may use the information available in the sample information 120 and, by using a selection method, may generate an updated training epoch 1202 that is selected as a subset from the standard training set 118. According to an example embodiment, the hard negative training program 110A, 110B may select one or more samples based on the selection methods such as: random selection, top score sample selection, categorical distribution selection, top number sample selection, higher probability selection, lowest stability selection, higher probability categorical distribution selection, and user defined selection as described below.

Random selection—Random selection of samples from the training standard set 118 according to a uniform distribution of the negative samples over samples in the training epoch with information 122 (according to uniform distribution over samples not selected by other methods).

Top score sample selection—Selection of top samples according to their score $s_i$ (i is an index of a sample) and a hyper parameter indicating how many samples to select, where hyper parameter is a value that is determined based on the deep neural network structure (i.e., number of hidden nodes) and the learning rate of the DNN.

Categorical distribution selection—Random selection according to a categorical distribution over samples that provides higher probability to be selected to samples with higher scores. This distribution can be defined, for example, by setting the probability to be selected for the i-th sample according to:

$$p_i^{(1)} = \frac{s_i^{1/\lambda_1}}{\sum_j s_j^{1/\lambda_1}}$$

where the normalization is by sum over all samples, and $\lambda_1$ is a hyper-parameter that can be modified as training progress. The above distribution approaches Dirac distribution with 1 probability for max $s_i$ as $\lambda_1 \to 0$.

Top number sample selection—Selection of top samples according to their number of epochs from last update $\delta_i$ and a hyper parameter indicating how many samples to select.

Higher probability selection—Random selection according to a categorical distribution over samples that provides higher probability to be selected to samples with a greater number of epochs from the previous selection. This distribution can be defined, for example, by setting the probability to be selected for the i-th sample according to:

$$p_i^{(2)} = \frac{\exp\left(\frac{\delta_i}{\lambda_2}\right)}{\sum_j \exp\left(\frac{\delta_j}{\lambda_2}\right)}$$

where the normalization is by sum over all samples and $\lambda_2$ is a hyper-parameter that can be modified as training progress. The above distribution approaches Dirac distribution with 1 probability for max $\delta_i$ as $\lambda_2 \to 0$.

Lowest stability selection—Selection of samples according to those with lowest stability/consistency in their scores history and a hyper parameter indicating how many samples to select. This stability/consistency can be computed e.g. by the entropy of the normalized histogram of each $u_i$, denoted as $H[v_i]$ where $v_i$ is the normalized histogram. Number of bins in the histogram calculation is according to a hyperparameter.

Higher probability categorical distribution selection—Random selection according to a categorical distribution over samples that gives higher probability to be selected to samples with smaller stability/consistency of scores history. This distribution can be defined e.g. by setting the probability to be selected for the i-th sample according to:

$$p_i^{(3)} = \frac{\exp\left(\frac{H[v_i]}{\lambda_3}\right)}{\sum_j \exp\left(\frac{H[v_j]}{\lambda_3}\right)}$$

where the normalization is by sum over all samples, and $\lambda_3$ is a hyper-parameter that can be modified as training progress. The above distribution approaches Dirac distribution with 1 probability for max $H[v_i]$ as $\lambda_3 \to 0$.

User defined selection—A user defined selection method from one specific distribution to combining all the distributions above or a subset of the aforementioned selection methods.

According to an example embodiment, the hard negative training program 110A, 110B may use one of the selection methods based on the hyper parameter. In another embodiment, the hard negative training program 110A, 110B may change the selection method after a preconfigured number of epochs.

Then, at 212, the hard negative training program 110A, 110B trains the DNN using the generated training epoch. According to an example embodiment, the hard negative training program 110A, 110B may perform one cycle of learning using the generated training epoch 120 in order to update the weights associated with the nodes of the DNN using gradient-based optimization or another optimization approach.

Then, at 214, the hard negative training program 110A, 110B determines whether the training is finished. According to an example embodiment, the hard negative training program 110A, 110B may determine that the training is finished when a condition is met, such as when the average score in the samples information is above a predefined threshold value. In another embodiment, the hard negative training program 110A, 110B may determine that the training is finished when a condition is met based on an input from the user. In a further embodiment, the hard negative training program 110A, 110B may determine that the training is finished when the average score value, when compared to historical or previous data, is within a predefined percentage value. If the hard negative training program 110A, 110B determines that the training is finished (step 214, "YES" branch), the hard negative training program 110A, 110B may terminate. If the hard negative training program 110A, 110B determines that the training is not finished (step 214, "NO" branch), the hard negative training program 110A, 110B may return to step 208 to update scores and information of the sample information. Therefore, the hard negative training program 110A, 110B may repeat steps 208-214 until a condition is met.

Figure 3:
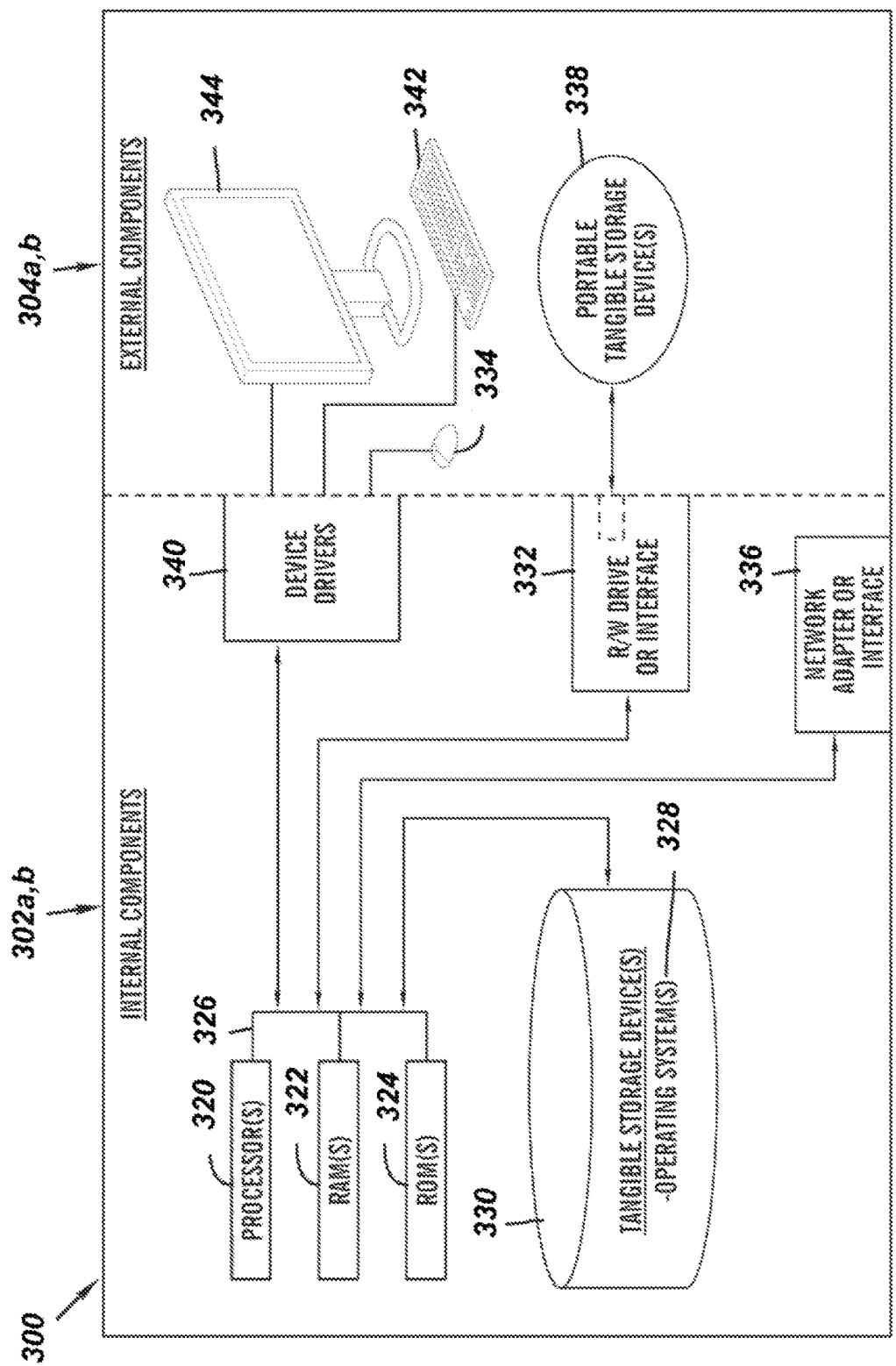
FIG. 3 is a block diagram of internal and external components of computers and servers depicted in FIG. 1 according to at least one embodiment.

It may be appreciated that FIG. 2 provides only an illustration of one implementation and does not imply any limitations with regard to how different embodiments may be implemented. Many modifications to the depicted environments may be made based on design and implementation requirements FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements The data processing system 302, 304 is representative of any electronic device capable of executing machine-readable program instructions. The data processing system 302, 304 may be representative of a smart phone, a computer system, PDA, or other electronic devices. Examples of computing systems, environments and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the hard negative training program 110A in the client computing device 102, and the hard negative training program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a RAY drive or interface 332 to read from and write to one or more portable computer-readable tangible storage devices 338 such as a CD-ROM, DVD, memory stick, magnetic tape, magnetic disk, optical disk or semiconductor storage device. A software program, such as the hard negative training program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the hard negative training program 110A in the client computing device 102 and the hard negative training program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the hard negative training program 110A in the client computing device 102 and the hard negative training program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
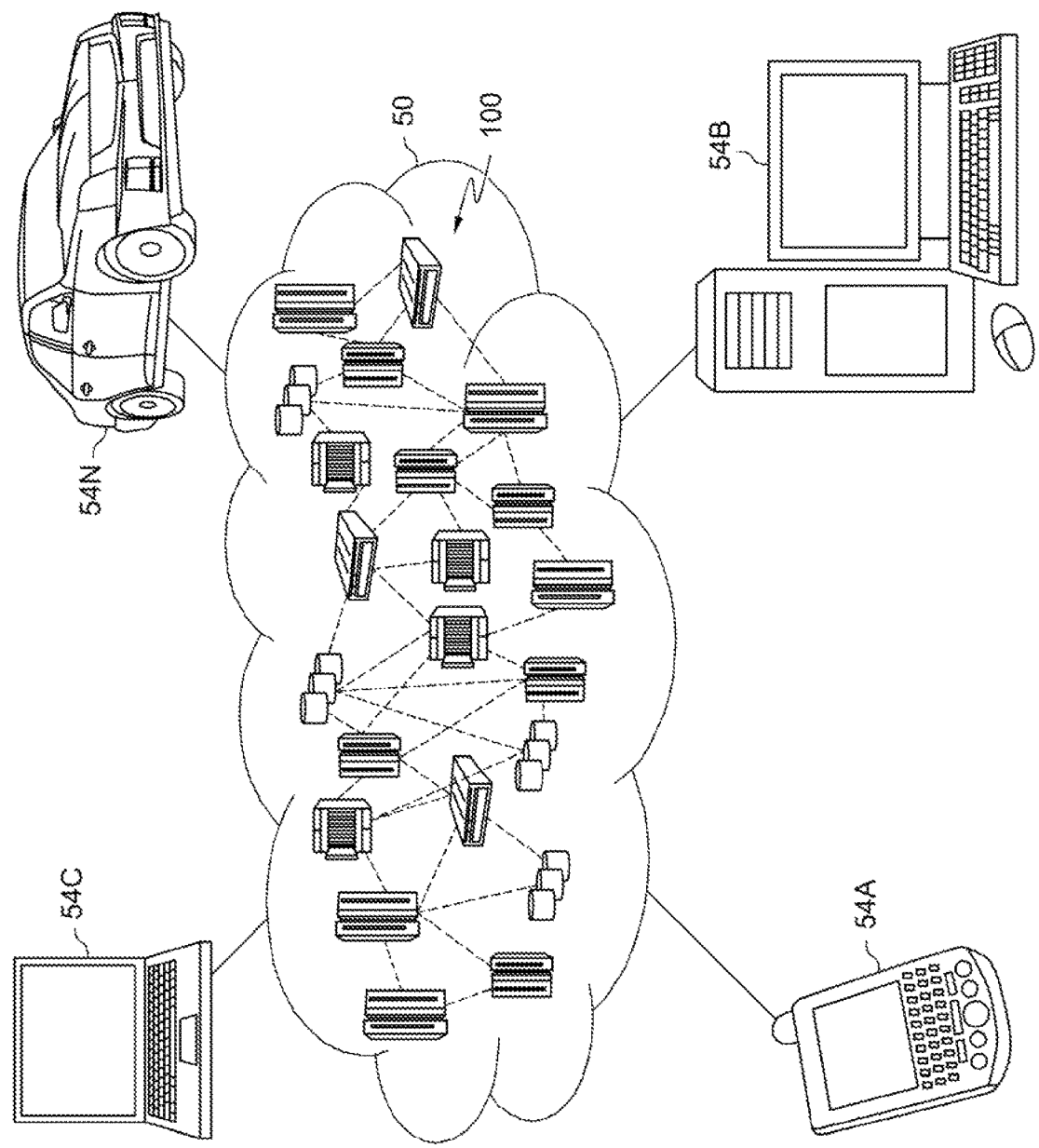
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
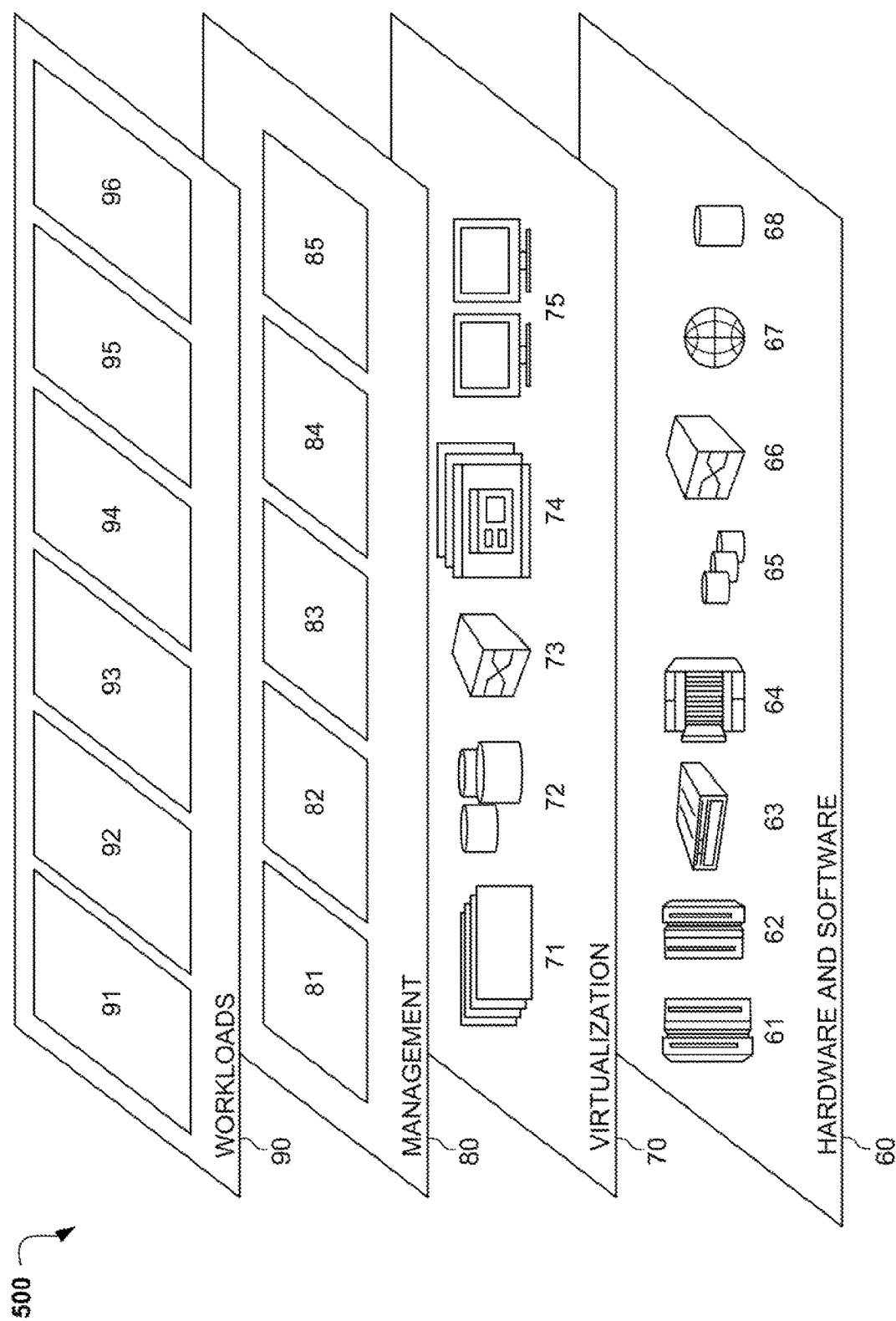
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hard negative training 96. Hard negative training 96 may relate to an improved method of training a deep neural network using training epochs that are updated based on the scores received by the samples in the previous iterations of the learning process.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for hard negative training, the method comprising:
receiving a training set, wherein the training set comprises training samples;
training a deep neural network (DNN) with the training set;
determining, using the training set as an input to the DNN, information for each of the training samples, wherein the information comprises one or more scores associated with the training samples, the one or more scores associated with the training samples being generated by the DNN in response to receiving the training set as the input and indicating whether the training samples are positive or negative;
generating a training epoch from the training samples based on the one or more scores associated with the training samples, wherein the training epoch comprises a subset of the training samples, wherein how many samples are included in the subset is determined based on a value of a hyper parameter;
updating the information based on using the training epoch as an input for the DNN, wherein the DNN is further trained via the using the training epoch as input to result in a further trained DNN model; and
performing classification by using the further trained DNN model on newly input samples.

2. The method of claim 1, further comprising:
iterating the determining, generating, and updating steps until a condition is met.

3. The method of claim 2, wherein the condition is met when an average of the one or more scores is above a threshold value.

4. The method of claim 2, wherein the condition is met when an average value of the one or more scores is within a percentage value of a historical value.

5. The method of claim 1, wherein the information further comprises a number of epochs and a history vector.

6. The method of claim 1, wherein the information further comprises a Boolean value representing whether a sample is positive.

7. The method of claim 1,
wherein the samples that have a highest sample score among the training samples are selected for the subset.

8. A computer system comprising:
one or more processors, one or more computer-readable memories, and program instructions stored on at least one of the one or more computer-readable memories for execution by the one or more processors to perform operations comprising:
receiving a training set, wherein the training set comprises training samples;
training a deep neural network (DNN) with the training set;
determining, using the training set as an input to the DNN, information for each of the training samples, wherein the information comprises one or more scores associated with the training samples, the one or more scores associated with the training samples being generated by the DNN in response to receiving the training set as the input and indicating whether the training samples are positive or negative;
generating a training epoch from the training samples based on the one or more scores associated with the training samples, wherein the training epoch comprises a subset of the training samples, wherein how many samples are included in the subset is determined based on a value of a hyper parameter;
updating the information based on using the training epoch as an input for the DNN, wherein the DNN is further trained via the using the training epoch as input to result in a further trained DNN model; and
performing classification by using the further trained DNN model on newly input samples.

9. The computer system of claim 8, wherein the operations further comprise:
iterating the determining, generating, and updating steps until a condition is met.

10. The computer system of claim 9, wherein the condition is met when an average of the one or more scores is above a threshold value.

11. The computer system of claim 9, wherein the condition is met when an average value of the one or more scores is within a percentage value of a historical value.

12. The computer system of claim 8, wherein the information further comprises:
a number of epochs and a history vector.

13. The computer system of claim 8, wherein the information further comprises a Boolean value representing whether a sample is positive.

14. The computer system of claim 8,
wherein the samples that have a highest sample score among the training samples are selected for the subset.

15. A computer program product comprising:
one or more computer-readable tangible storage media and program instructions stored on at least one of the one or more tangible storage media to perform operations comprising:
receiving a training set, wherein the training set comprises training samples;
training a deep neural network (DNN) with the training set;
determining, using the training set as an input to the DNN, information for each of the training samples, wherein the information comprises one or more scores associated with the training samples, the one or more scores associated with the training samples being generated by the DNN in response to receiving the training set as the input and indicating whether the training samples are positive or negative;
generating a training epoch from the training samples based on the one or more scores associated with the training samples, wherein the training epoch comprises a subset of the training samples, wherein how many samples are included in the subset is determined based on a value of a hyper parameter;
updating the information based on using the training epoch as an input for the DNN, wherein the DNN is further trained via the using the training epoch as input to result in a further trained DNN model; and
performing classification by using the further trained DNN model on newly input samples.

16. The computer program product of claim 15, wherein the operations further comprise:
  iterating the determining, generating, and updating steps until a condition is met.

17. The computer program product of claim 16, wherein the condition is met when an average of the one or more scores is above a threshold value.

18. The computer program product of claim 16, wherein the condition is met when an average value of the one or more scores is within a percentage value of a historical value.

19. The computer program product of claim 15, wherein the information further comprises:
  a number of epochs and a history vector.

20. The computer program product of claim 15, wherein the information further comprises a Boolean value representing whether a sample is positive.

* * * * *